United States Patent [19]
Krantz

[11] Patent Number: 5,584,440
[45] Date of Patent: Dec. 17, 1996

[54] LIGHTWEIGHT VIDEO CASSETTE CARTRIDGE

[75] Inventor: Kermit T. Krantz, Leawood, Kans.

[73] Assignee: V-Lite Corporation, Leawood, Kans.

[21] Appl. No.: 554,080

[22] Filed: Nov. 6, 1995

[51] Int. Cl.$^6$ .................................................. G11B 23/087
[52] U.S. Cl. ............................................................ 242/347
[58] Field of Search ................................. 242/343, 343.1, 242/343.2, 345, 345.2, 347; 360/132

[56] References Cited

U.S. PATENT DOCUMENTS

| | | |
|---|---|---|
| 4,267,986 | 5/1981 | Uemura et al. ........................ 242/346 |
| 4,290,567 | 9/1981 | Saito . |
| 4,330,068 | 5/1982 | Shoji ....................................... 242/346 |
| 4,387,823 | 6/1983 | Shiba ....................................... 242/347 |
| 4,438,892 | 3/1984 | Fitterer et al. . |
| 4,452,407 | 6/1984 | Ogata et al. . |
| 4,453,683 | 6/1984 | Reimer et al. . |
| 4,505,440 | 3/1985 | Kawashima . |
| 4,559,574 | 12/1985 | Umeda . |
| 4,763,218 | 8/1988 | Westfall et al. . |
| 4,802,048 | 1/1989 | Perkins et al. . |
| 4,819,889 | 4/1989 | Satoh ...................................... 242/347 |
| 4,819,890 | 4/1989 | Carroll . |
| 4,842,217 | 6/1989 | Vinson . |
| 4,883,176 | 11/1989 | Hart et al. . |
| 4,969,612 | 11/1990 | Thomas . |
| 5,092,536 | 3/1992 | Gelardi et al. . |
| 5,114,092 | 5/1992 | Gelardi et al. . |
| 5,146,376 | 9/1992 | Imanaga et al. . |
| 5,199,662 | 4/1993 | Klupt . |
| 5,199,663 | 4/1993 | Klupt . |
| 5,201,476 | 4/1993 | Gelardi et al. . |
| 5,311,388 | 5/1994 | McLaren .................................. 242/343 |
| 5,398,881 | 3/1995 | Krantz et al. . |
| 5,470,028 | 11/1995 | Krantz et al. ........................ 242/343.2 |
| 5,482,222 | 1/1996 | Krantz .................................... 242/347 |

FOREIGN PATENT DOCUMENTS

| 155225 | 9/1979 | United Kingdom . |
|---|---|---|
| 210487 | 3/1983 | United Kingdom . |

Primary Examiner—John P. Darling
Attorney, Agent, or Firm—Hovey, Williams, Timmons & Collins

[57] ABSTRACT

A lightweight video cassette cartridge includes a cartridge shell and an outer structural frame that is secured to the front face of the cartridge shell for significantly increasing the rigidity of the cartridge shell without adding excessive weight to the lightweight video cassette cartridge.

12 Claims, 1 Drawing Sheet

LIGHTWEIGHT VIDEO CASSETTE CARTRIDGE

FIELD OF THE INVENTION

The present invention relates to an inexpensive, limited use video cassette cartridge formed of lightweight, recyclable materials. More particularly, the present invention relates to a lightweight video cassette cartridge including an outer structural frame that significantly increases the rigidity of the lightweight video cassette cartridge without adding excessive weight.

BACKGROUND OF THE INVENTION

The recent proliferation of video cassette players and recorders has created a new market for video taped advertisements and messages. This new market has created an enormous demand for inexpensive and lightweight limited use video cassette cartridges that are suitable for mailing. These cassettes are also suitable for non-commercial recordings such as public service announcements and personal messages sent to family and friends.

Lightweight limited use video cassette cartridges are known in the art. However, many conventional lightweight video cassette cartridges are poorly designed and lack structural rigidity. For example, prior art cassette cartridges typically include a cassette shell formed from a pair of mating top and bottom panels. The panels are typically connected by a plurality of support posts or columns. A pair of video tape reels are positioned between the panels for winding video tape.

This prior art construction does not offer sufficient structural rigidity because the support posts have to be spaced a sufficient distance apart to provide space for the video tape reels. This results in a finished cassette cartridge which is weak and flimsy. This weak and flimsy design prevents advertisers and consumers from making full use of conventional lightweight video cassette cartridges because they commonly become damaged and thus inoperative during handling. For example, since lightweight video cassette cartridges are often mailed, they are exposed to rough handling. As a result of the poor design of conventional lightweight video cassette cartridges, their support posts commonly break or dislodge during handling and mailing.

Applicant has developed several improved lightweight video cassette cartridges that have provided a significant advance in the art of video cassette cartridges. For example, U.S. Pat. No. 5,398,881, hereby incorporated by reference, discloses a lightweight video cassette cartridge with structure that provides improved structural rigidity. The present invention discloses another improved lightweight video cassette cartridge with novel structure that further improves the rigidity of the cassette cartridge.

SUMMARY AND OBJECTS OF THE INVENTION

In view of the limitations of prior art video cassette cartridges described above, it is an object of the present invention to provide an improved lightweight limited use video cassette cartridge that is inexpensive to manufacture and mail.

It is another object of the present invention to provide a lightweight limited use cassette cartridge that is sufficiently rigid to withstand rough handling and mailing.

It is another object of the present invention to provide a lightweight limited use cassette cartridge that includes an outer structural frame that significantly increases the rigidity of the cassette cartridge without adding excessive weight to the cassette cartridge.

In accordance with these and other objects evident from the following description of a preferred embodiment of the invention, an improved lightweight video cassette cartridge is provided. The preferred lightweight video cassette cartridge broadly includes a cartridge shell presenting opposed front and rear faces and opposed side faces, a pair of video tape reels rotatably mounted within the cartridge shell, and an outer structural frame secured to the cartridge shell for significantly increasing the structural rigidity of the cassette cartridge.

In more detail, the outer structural frame includes an elongated front panel presenting axially opposed end margins and a pair of elongated side panels extending transversely from said front panel end margins. The outer structural frame is secured between the to the cartridge shell so that its front panel covers a portion of the cartridge shell front face and its side panels cover a portion of the cartridge shell side faces. In preferred forms, the front panel and side panels of the outer structural frame are integral and are injection molded of synthetic resin materials.

By constructing a lightweight video cassette cartridge as described herein, numerous advantages are realized. For example, by providing an outer structural frame that is secured to the cartridge shell, the overall rigidity of the lightweight video cassette cartridge is greatly improved. When secured to the cartridge shell, the outer structural frame provides a uni-body type chassis for supporting the components of the cartridge shell. The uni-body chassis significantly increases the rigidity of the lightweight video cassette cartridge without adding excessive weight. This provides a lightweight video cassette cartridge that is suitable for limited use applications and is also capable of withstanding rough handling and mailing.

BRIEF DESCRIPTION OF THE DRAWINGS

A preferred embodiment of the present invention is described in detail below with reference to the attached drawings, wherein.

DETAILED DESCRIPTION OF THE PREFERRED EMBODIMENTS

Figure 1:
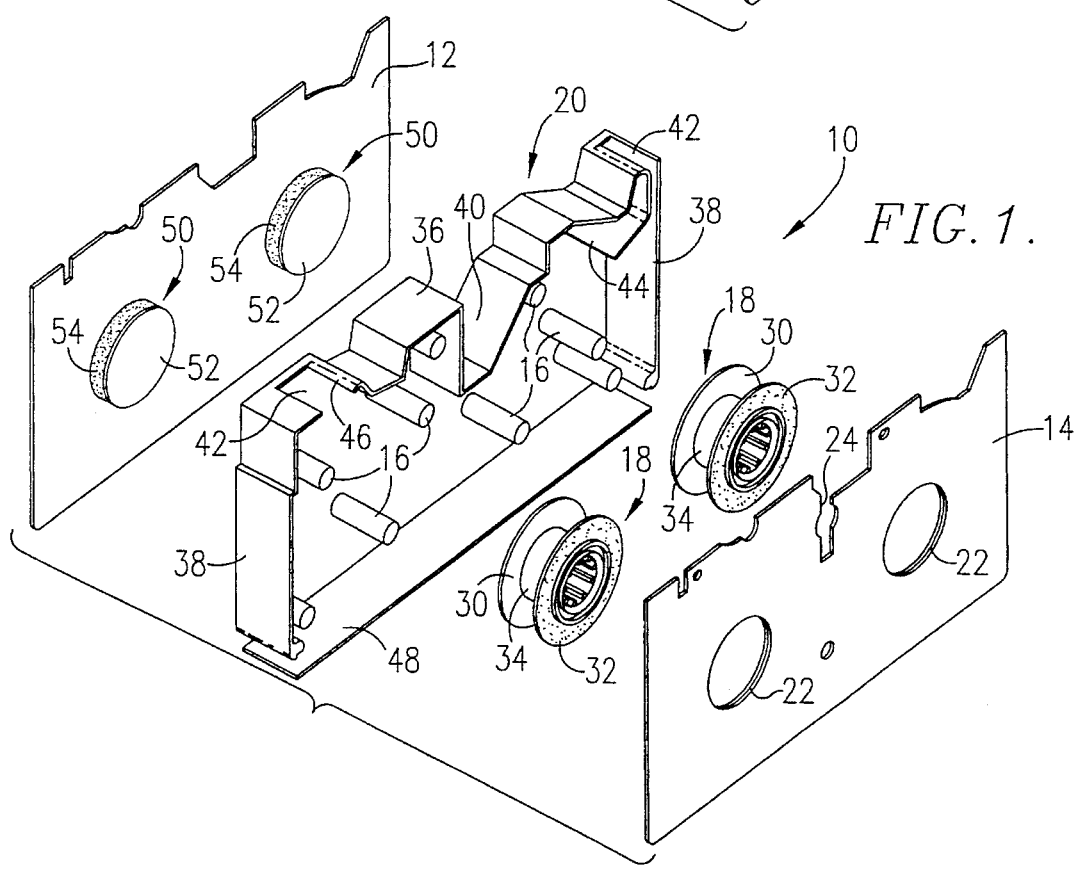
FIG. 1 is an exploded perspective view of a lightweight video cassette cartridge constructed in accordance with a first embodiment of the invention.

Referring to the drawing figures and particularly FIG. 1, a lightweight video cassette cartridge 10 constructed in accordance with a first preferred embodiment of the invention is illustrated. The cassette cartridge 10 is configured for use with a conventional video cassette recorder (VCR) and broadly includes a top panel 12, a bottom panel 14, support members 16 for supporting the top and bottom panels 12 and 14 in a spaced-apart configuration, a pair of video tape reels 18 rotatably mounted between the top and bottom panels 12 and 14 for winding video tape, and an outer structural frame 20 secured to the cartridge shell for significantly increasing the structural rigidity of the lightweight video cassette cartridge 10.

In more detail, the top panel 12, bottom panel 14, and support members 16 form a cartridge shell presenting a front face, a rear face, and opposed side faces. The top and bottom panels 12 and 14 are generally rectangular in shape and are preferably die cut from a sheet of thin synthetic resin material. The bottom panel 14 includes a pair of openings 22 for receiving the drive spindles of a VCR. The openings 22 are aligned with the video tape reels 18 so that the VCR spindles can engage and rotate the video tape reels 18. The front face of the bottom panel 14 also includes a slotted portion 24 for permitting passage of the VCR's drive assembly.

The portions of the inner surface of the bottom panel 14 circumscribing the openings 22 are textured. As described below, these textured portions cooperate with the textured portions on the video tape reels 18 to provide a friction brake system that inhibits the video tape reels 18 from rotating when the cassette cartridge 10 is not in use.

The support members 16 are provided for supporting the top and bottom panels 12 and 14 in a spaced-apart configuration. When the lightweight video cassette cartridge 10 is assembled, the support means 16 and the top and bottom panels 12 and 14 define a cartridge shell having an interior hollow chamber for receiving the video tape reels 18 and video tape wound thereon.

Figure 2:
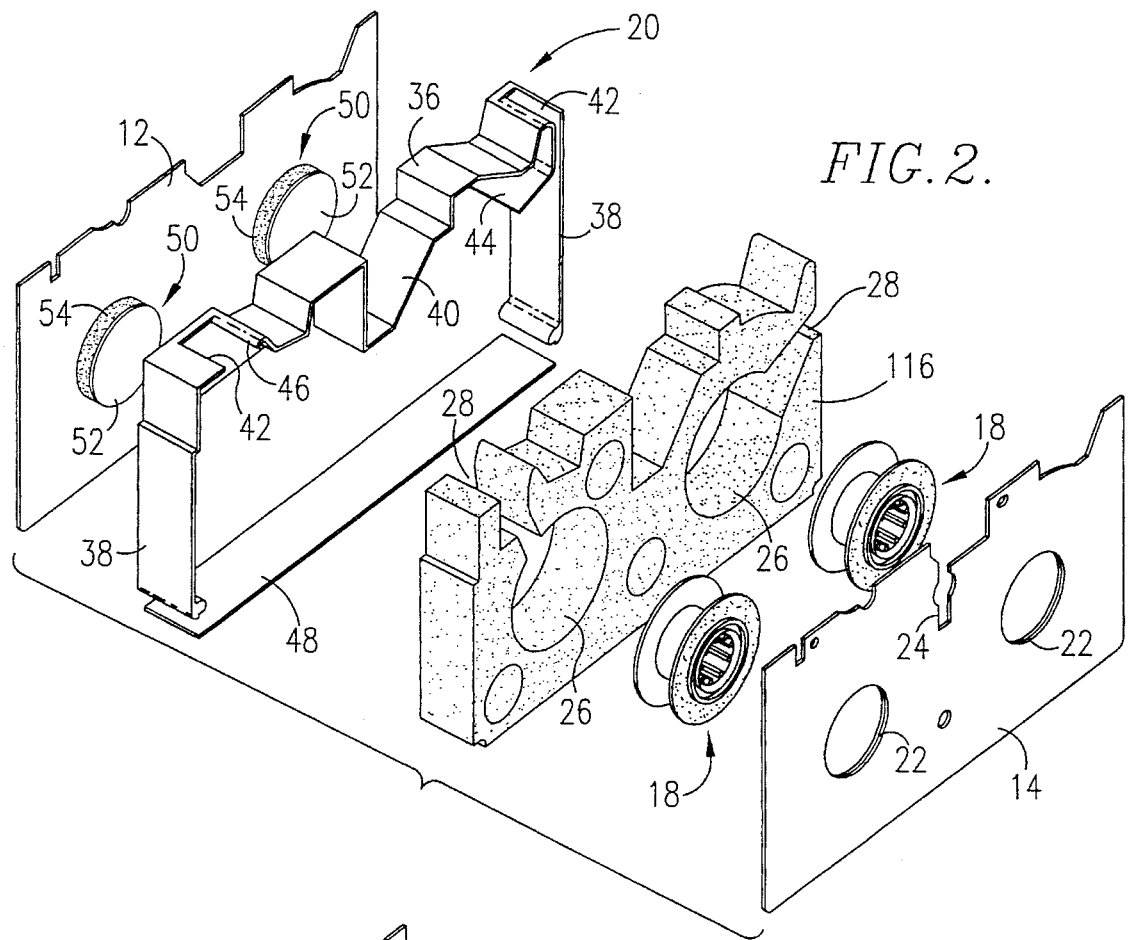
FIG. 2 is an exploded perspective view of a lightweight video cassette cartridge constructed in accordance with a second embodiment of the invention.

As illustrated in FIG. 2, the support members 16 of the first embodiment of the invention include a plurality of support posts positioned between the top and bottom panels 12 and 14 within the interior hollow chamber of the cartridge shell. The support posts are preferably formed of synthetic resin materials and may be solid or hollow. The support posts extend transversely between the top and bottom panels 12 and 14 and are preferably bonded to or integrally formed with either the top panel 12 or the bottom panel 14. The panel that is not initially bonded with the support posts is then secured to the support posts with conventional adhesives.

FIG. 2 illustrates a second embodiment of the invention wherein the support members 16 are replaced with a solid core structural member 116 positioned within the interior hollow chamber of the cartridge shell. The solid core structural member 116 maintains the spaced relationship between the top and bottom panels 12 and 14 and adds a substantial amount of additional rigidity to the lightweight video cassette cartridge 10.

The solid core structural member 116 is preferably formed from a single piece of lightweight material such as styrofoam, cardboard, synthetic resin, inflated or expanded corn starch, carbon fiber or fiberglass. To reduce its weight while maintaining its size, the solid core member 116 may also be formed with honeycomb or corrugated layers.

The solid core member 116 presents a thickness greater than or equal to the height of the video tape reels 18. In preferred forms, the solid core structural member 116 presents a volume nearly equal to the volume of the cartridge shell interior hollow chamber. Accordingly, the solid core member 116 fills substantially the entire volume of the cartridge shell hollow chamber.

As illustrated in FIG. 2, the solid core structural member 116 includes a pair of circular openings 26 defining a pair of reel wells configured for receiving the video tape reels 18. The solid core structural member 116 also includes a pair of passageways 28 connecting the circular reel wells to the exterior of the cassette cartridge 10 for permitting delivery of video tape to and from the video tape reels 18.

The top and bottom panels 12 and 14 are preferably secured to the solid core member 116 by conventional adhesives such as glue or tape. Alternatively, the cassette cartridge 10 may include pins formed on the top and bottom panels 12 and 14 which penetrate through the solid core member 116 and snap together to interlock the top and bottom panels 12 and 14.

The solid core member 116 supports the entire surface areas of top and bottom panels 12 and 14. Thus, the assembled lightweight video cassette cartridge 10 has substantial rigidity. This allows the cassette cartridge 10 to withstand rough handling and mailing. Moreover, since the solid core member 116 is formed of lightweight materials, the assembled lightweight video cassette cartridge 10 weighs substantially less than prior art lightweight video cassette cartridges.

The video tape reels 18 are rotatably mounted within the circular reel wells for winding video tape. Each reel includes an upper flange 30 and a lower flange 32 surrounding a central drum 34. In preferred forms, the flanges 30 and 32 and central drum 34 are integrally formed in a thermoform molding process.

The lower flanges 32 of the video tape reels 18 are textured to engage the textured portion of the bottom panel 14. This provides a friction braking system that eliminates the need for a complicated active braking system typically found in prior art lightweight video cassette cartridges.

The outer structural frame 20 is secured to the cartridge shell for significantly increasing the structural rigidity of the cassette cartridge 10. As illustrated in the drawing figures, the outer structural frame 20 includes an elongated front panel 36 and a pair of elongated side panels 38 extending transversely from opposite ends of the front panel 36. The outer structural frame 20 is secured to the cartridge shell so that its front panel 36 covers the cartridge shell front face and its side panels 38 cover all of or a portion of the cartridge shell side faces.

In preferred forms, the front panel 36 and side panels 38 are integrally formed of injection molded synthetic resin materials. Injection molding allows the outer structural frame 20 to be formed within precise tolerances so that it fits securely over the front and side faces of the cartridge shell.

As illustrated, the front panel 36 includes an inwardly extending V-shaped portion 40. The front panel 36 follows the contours of the front face of the solid core member 116 and includes a pair of openings 42 that are in alignment with the passageways 28 in the solid core member 116 for permitting delivery of video tape into and out of the cartridge shell.

The right side of the front panel 36 includes an inwardly angled wall section 44 that serves to guide video tape into and out of its corresponding circular reel well and to provide additional support for the top and bottom panels 12 and 14 of the cartridge shell. Similarly, the left side of the front panel 36 includes a guide post 46 that serves to guide video tape into and out of its corresponding circular reel well and to provide additional support for the top and bottom panels 12 and 14 of the cartridge shell. The angled wall section 44 and guide post 46 are preferably covered with a friction resistant tape to allow video tape to more easily slide in and out of the cassette cartridge 10. The angled wall section 44 and guide post 46 serve the same function as rollers used in prior art cassette cartridges, but conserve manufacturing time and cost due to their integral nature.

The lightweight video cassette cartridge 10 may also include a rear structural frame member 48 secured to the ends of the side panels 38 for adding additional rigidity to the lightweight video cassette cartridge 10. The rear structural frame member 48 is also preferably injection molded of synthetic resin materials.

The lightweight video cassette cartridge 10 also includes a pair of reel springs 50 secured to the interior surface of the top panel 12 configured to exert an opposing downward force upon the video tape reels 18 when the video tape reels 18 are subjected to an upward force delivered by the VCR spindles. The reel springs 50 maintain the alignment of the video tape reels 18 within the cartridge 10. Each reel spring 50 includes a rigid circular disk 52 formed of plastic or other similar material and a circular spring portion 54 formed of lightweight sponge material or foam rubber. The circular spring portion 54 preferably presents a thickness of approximately ⅛–¼ inch.

One face of the circular spring portion 54 is bonded inside the top panel 12 immediately opposite the circular reel wells. The other face is bonded to the rigid circular disk 52. Accordingly, the rigid circular disks 52 contact the video tape reels 18, and the circular spring portions 54 bias the video tape reels 18 downward while the cartridge 10 is in use.

When the video tape reels 18 are pushed upward by the VCR drive spindles, the circular spring portions 54 compress slightly. The compressed spring portions 54 provide an opposing force on the video tape reels 18 which maintains the alignment of the reels.

The lightweight video cassette cartridge 10 may also include a removable dust cover (not shown) which slips over the front face of the cartridge shell to protect the exposed video tape from contamination or damage when the cartridge 10 is not in use.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A lightweight video cassette cartridge for use in a video cassette recorder/player comprising:

a top panel;

a bottom panel, and a solid core structural member formed of styrofoam positioned between said top and bottom panels for supporting said top and bottom panels in a spaced-apart configuration for forming a cartridge shell presenting opposed front and rear faces and opposed side faces, said solid core structural member including walls defining a pair of circular reel wells;

a pair of video tape reels rotatably mounted within said circular reel wells for winding of video tape; and an outer structural frame secured over said cartridge shell front face and a portion of said side faces and extending between said top and bottom panels for increasing the rigidity of said cartridge shell.

2. The lightweight video cassette cartridge as set forth in claim 1, said outer structural frame including an elongated front panel and a pair of elongated side panels extending transversely from opposite ends of said front panel.

3. The lightweight video cassette cartridge as set forth in claim 2, said outer structural frame front panel including a pair of openings therein for permitting delivery of video tape into and out of said cartridge shell.

4. The lightweight video cassette cartridge as set forth in claim 1, said support means including a plurality of support posts positioned within said interior hollow chamber and extending transversely between said top and bottom panels for maintaining the spaced relationship between said top and bottom panels.

5. The lightweight video cassette cartridge as set forth in claim 1, further including rotation inhibiting means for inhibiting the rotation of said video tape reels within said circular reel wells when said lightweight video cassette cartridge is not in use, said rotation inhibiting means being integrally formed on said circular reel wells and said video tape reels.

6. The lightweight video cassette cartridge as set forth in claim 5, said rotation inhibiting means consisting of a textured surface integrally molded on said circular reel wells and said video tape reels.

7. The lightweight video cassette cartridge as set forth in claim 1, said solid core structural member including a pair of passageways connected to said circular reel wells and in alignment with said openings in said outer frame member front panel for permitting delivery of video tape into and out of said cartridge shell and to and from said video tape reels.

8. The lightweight video cassette cartridge as set forth in claim 1, said bottom panel including a pair of openings aligned with said circular reel wells, said openings being of a diameter smaller than the diameter of said circular reel wells to retain said video tape reels within said circular reel wells.

9. A lightweight video cassette cartridge for use in a video cassette recorder/player comprising:

a cartridge shell presenting opposed front and rear faces and opposed side faces, said cartridge shell including, a top panel, a bottom panel, and support means for supporting said top panel and bottom panels in a spaced-apart configuration to present an interior hollow chamber therebetween, said support means including a plurality of support posts positioned within said interior hollow chamber and extending transversely between said top and bottom panels for maintaining the spaced relationship between said top and bottom panels;

a pair of video tape reels rotatably mounted within said interior hollow chamber for winding of video tape;

an outer structural frame secured to said cartridge shell for increasing the rigidity of said cartridge shell, said outer structural frame including an elongated front panel presenting axially opposed end margins secured to said cartridge shell front face and a pair of elongated side panels extending transversely from said front panel end margins secured to a portion of said cartridge shell side faces; and a pair of reel springs attached to said top panel for maintaining the alignment and position of said video tape reels, said reel springs each including a rigid reel engaging portion and a compressible biasing portion for biasing said rigid reel engaging portion towards one of said video tape reels.

10. The lightweight video cassette cartridge as set forth in claim 9, wherein said biasing portion is formed of foam rubber material.

11. The lightweight video cassette cartridge as set forth in claim 9, wherein said biasing portion is formed of sponge material.

12. The lightweight video cassette cartridge as set forth in claim 9, wherein said biasing portion is formed of rubber material.

* * * * *